US008805610B2

(12) United States Patent
Bagheri et al.

(10) Patent No.: US 8,805,610 B2
(45) Date of Patent: Aug. 12, 2014

(54) METHODS FOR ESTIMATING ANNUAL AVERAGE DAILY TRAFFIC

(75) Inventors: Ehsan Bagheri, Toronto (CA); Ming Zhong, Fredericton (CA); James Christie, Saint John (CA)

(73) Assignee: University of New Brunswick, Fredericton, New Brunswick (CA)

( * ) Notice: Subject to any disclaimer, the term of this patent is extended or adjusted under 35 U.S.C. 154(b) by 0 days.

(21) Appl. No.: 13/523,483

(22) Filed: Jun. 14, 2012

(65) Prior Publication Data

US 2013/0110384 A1 May 2, 2013

Related U.S. Application Data

(60) Provisional application No. 61/554,207, filed on Nov. 1, 2011.

(30) Foreign Application Priority Data

Nov. 1, 2011 (CA) ...................................... 2756916

(51) Int. Cl.

| | |
|---|---|
| ***G06F 19/00*** | (2011.01) |
| ***G06G 7/70*** | (2006.01) |
| ***G06G 7/76*** | (2006.01) |
| ***G08G 1/01*** | (2006.01) |

(52) U.S. Cl.
USPC .......................................... 701/117; 701/118

(58) Field of Classification Search
USPC .................................................. 701/117, 118
See application file for complete search history.

(56) References Cited

U.S. PATENT DOCUMENTS

| | | | | |
|---|---|---|---|---|
| 5,164,904 | A | 11/1992 | Sumner | |
| 5,798,949 | A | 8/1998 | Kaub | |
| 5,822,712 | A * | 10/1998 | Olsson | 701/117 |
| 6,463,382 | B1 | 10/2002 | Bullock | |
| 6,615,131 | B1 | 9/2003 | Rennard et al. | |
| 7,161,497 | B2 | 1/2007 | Gueziec | |
| 7,328,141 | B2 | 2/2008 | Azinger | |
| 7,487,074 | B2 | 2/2009 | Ohtsu et al. | |
| 7,698,055 | B2 | 4/2010 | Horvitz et al. | |
| 7,813,870 | B2 | 10/2010 | Downs et al. | |
| 7,970,530 | B2 | 6/2011 | Desai et al. | |
| 8,014,936 | B2 | 9/2011 | Chapman et al. | |
| 2004/0038671 | A1 * | 2/2004 | Trayford et al. | 455/414.3 |
| 2009/0198441 | A1 * | 8/2009 | Kumagai et al. | 701/117 |
| 2011/0173015 | A1 * | 7/2011 | Chapman et al. | 705/1.1 |

FOREIGN PATENT DOCUMENTS

| | | | |
|---|---|---|---|
| CA | 2257438 | A1 | 5/1998 |
| CA | 2390352 | C | 4/2001 |

OTHER PUBLICATIONS

Kurt Baron, Jared Aldstadt, "An ArcGIS Application of Spatial Statistics to Precipitation Modeling", Proc. ESRI Inter. User Conf. (2003).

R. R. Bodie, "Evaluation of Rural Coverage Count Duration for Estimating Annual Average Daily Traffic", (1966) N.p.: U.S. Department of Commerce.

(Continued)

*Primary Examiner* — Fadey Jabr
*Assistant Examiner* — Martin Weeks
(74) *Attorney, Agent, or Firm* — Eugene F. Derényi; Fogler, Rubinoff LLP

(57) ABSTRACT

Methods for estimating annual average daily traffic for a road segment from historical traffic counts are disclosed.

11 Claims, 8 Drawing Sheets

(56) References Cited

OTHER PUBLICATIONS

J. Christie, "Modification to the Ontario Model", Fredericton: New Brunswick Department of Transportation (1977).
Gary A. Davis, Yuzhe Guan, "Bayesian Assignment of Coverage Count Locations to Factor Groups and Estimation of Mean Daily Traffic", J. Transport. Research Board 1542: 30-37 (1996).
U.S. EPA, "VMT Forecasting and Tracking Guidance Section 187", (1992).
E. J. Christopher, "Traffic Monitoring for Air Quality aka VMT Estimating Tracking and Forecasting", Proc. Nat. Traffic Data Acquisition Cont, 345-370 (1996).
FHWA. (1997). "FHWA Study Tour for European Traffic Monitoring Programs and Technologies". FHWA's International Technology Scanning Program.
G. Leduc, "Road Traffic Data Collection Methods and Applications", JRC Technical Notes, Working Papers on Energy, Transport, and Climate Change N.1 (2008).
K. Robichaud & M. Gordon, "An Assessment of Data Collection Techniques for Highway Agencies", Journal of Transportation Research Board 1855: 129-135 (2003).
S. C. Sharma, "Estimation of Annual Average Daily Traffic on Low-Volume Roads: Factor Approach Versus Neural Networks" Transportation Research Record 1719: 103-111 (2000).
E. Stolz, "State Department of Transportation's (DOT's) Travel Monitoring Survey Results Report", Colorado Department of Transportation (2007).
M. Zhong & G. Liu, "Establishing and Managing Jurisdication-wide Traffic Monitoring Systems: North American Experiences". J. Transport. Sys. Engin. Info. Tech. 7(6): 25-38, Dec. 2007.
Aashto, "Guidelines for Traffic Data Programs", N.p.: American Association of State Highway and Transportation Officials (1992).
Albright, D. (1990), "Survey of Traffic Monitoring Practices Among State Transportation Agencies of the United States", N.p.: New Mexico State Highway and Transportation Department.
ESRI, "ArcGIS Geostatistical Analyst: Statistical Tools for Data Exploration, Modeling, and Advanced Surface Generation", New York: ESRI (2001).
ESRI, "How Hot Spot Analysis (Getis-Ord Gi*) works" (ESRI) Retrieved 11 2010, from ArcGIS Resource Center.
FHWA, (1970), "Guide for Traffic Volume Counting Manual", (3rd ed.). Washington D.C.: U.S. Department of Transportation, Federal Highway Administration. (cover and pp. i to iii).
FHWA, "Traffic Monitoring Guide", U.S Department of Transportation, Federal Highway Administration, Office of Highway Policy Information (2001).
Google Earth name page. Retrieved Jan. 20, 2014, from Earth. Google.com.
M. D. Harmelink, "Estimation of Annual Average Daily Traffic (AADT) and Thirtieth", DHO Report No. 140, Department of Highways (1968).
K. Kemp, "Encyclopedia of Geographic Information Science", SAGE (2008).
K. Koch, "Introduction to Bayesian Statistics", Springer (2007).
Saskatchewan Highways and Transportation, "Accuracy of Estimating Average Annual Daily Traffic from 48 Hour Coverage Counts", Operational Planning and Business Support Branch (2000).

* cited by examiner

METHODS FOR ESTIMATING ANNUAL AVERAGE DAILY TRAFFIC

FIELD

The present invention relates to estimation of travel demand.

BACKGROUND

A reliable estimate of travel demand has always been one of the main concerns of transportation agencies. Annual Average Daily Traffic (AADT) is one of the important factors being used in planning, design, and management of roads and facilities. The Federal Highway Administration (FHWA) factoring method is widely used by highway agencies to estimate AADTs for a wide range of roads, which are not possible to be covered by permanent counters. In this method, roads in the same functional class are assumed to have similar traffic patterns, and factors derived from the class can be used to account for seasonal variations of roads within the same class. It has been shown in the literature that since road functional class does not represent the seasonal traffic variation on a road, this method may sometimes produce large errors.

Traffic statistics such as annual average daily traffic (AADT), design hourly volume (DHV), and average daily vehicle distance traveled (ADVDT) are important parameters used by many transportation agencies in their projects. These agencies commit significant financial and human resources to collect traffic data and estimate these parameters.

Traffic Monitoring Guide, (Federal Highway Administration (FHWA), 2001) describes two basic components recommended for traffic monitoring programs: continuous count programs and short-term count programs. The continuous count programs measure the traffic volume using permanent traffic counters. These data are collected at 15-min intervals and stored at 1 hour intervals, for 365 days of the year. Information provided by these counters are used to study the temporal variations of traffic volume such as time-of-day, day-of-week, and seasonal traffic patterns on the roadways, which are used to convert short-term traffic counts (STTCs) into AADTs.

Short-term count programs serve as a comprehensive coverage program and are used for covering the majority of road segments without permanent traffic counters within a jurisdiction. One short-term count is usually collected for a road segment every few years and the collection periods usually vary from 1 to 7 days.

Transportation agencies tend to simply use road functional class as the criteria to assign short-term traffic counts to automatic traffic recorders (ATR) factor groups (FHWA 2001) (Traffic Monitoring Guide, 2001); or they use methods such as regression analysis which require excessive data collection efforts. Further, only the count from most recent year is used in the process of estimating AADT. All historical counts collected beyond the most recent year are ignored.

SUMMARY OF THE DISCLOSURE

In one implementation, the present disclosure is directed to a method of estimating AADT estimations by constructing seasonal traffic variation profiles using historical short-term counts available without imposing any additional monitoring cost, or making any change to existing traffic monitoring programs.

In another implementation, the present disclosure is directed to a pattern matching method to estimate AADTs for short-term counting sites using historical counts. Expansion factors are used to convert these counts to AADTs. The factors are based on the traffic seasonal patterns and the present disclosure in one implementation is directed to a method for matching a permanent traffic counter (PTC) with a similar pattern to the STTC site to derive the appropriate factors.

A computer-implemented method for estimating annual average daily traffic for a first epoch for a first road segment comprising 1) providing historical traffic counts for the road segment from a short-term traffic counter from one or more historical epochs which predate the first epoch; 2) providing data from a first permanent traffic counter; 3) calculating one or more growth factors from the data of the first permanent traffic counter; 4) applying the one or more growth factors to the historical short-term traffic counts and converting the historical traffic counts to traffic counts in the first epoch; 5) converting the converted traffic counts in the first epoch to equivalent monthly average daily traffic values; 6) using the equivalent monthly average daily traffic values to construct a first seasonal traffic pattern for first road segment; 7) finding a matching seasonal traffic pattern, derived from a second permanent traffic counter, to the seasonal traffic pattern of the short-term traffic counting site; and 8) deriving an annual average daily traffic value from the short-term traffic counter of first epoch using one or more expansion factors from the second permanent traffic counter for the first road segment.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Figure 1:
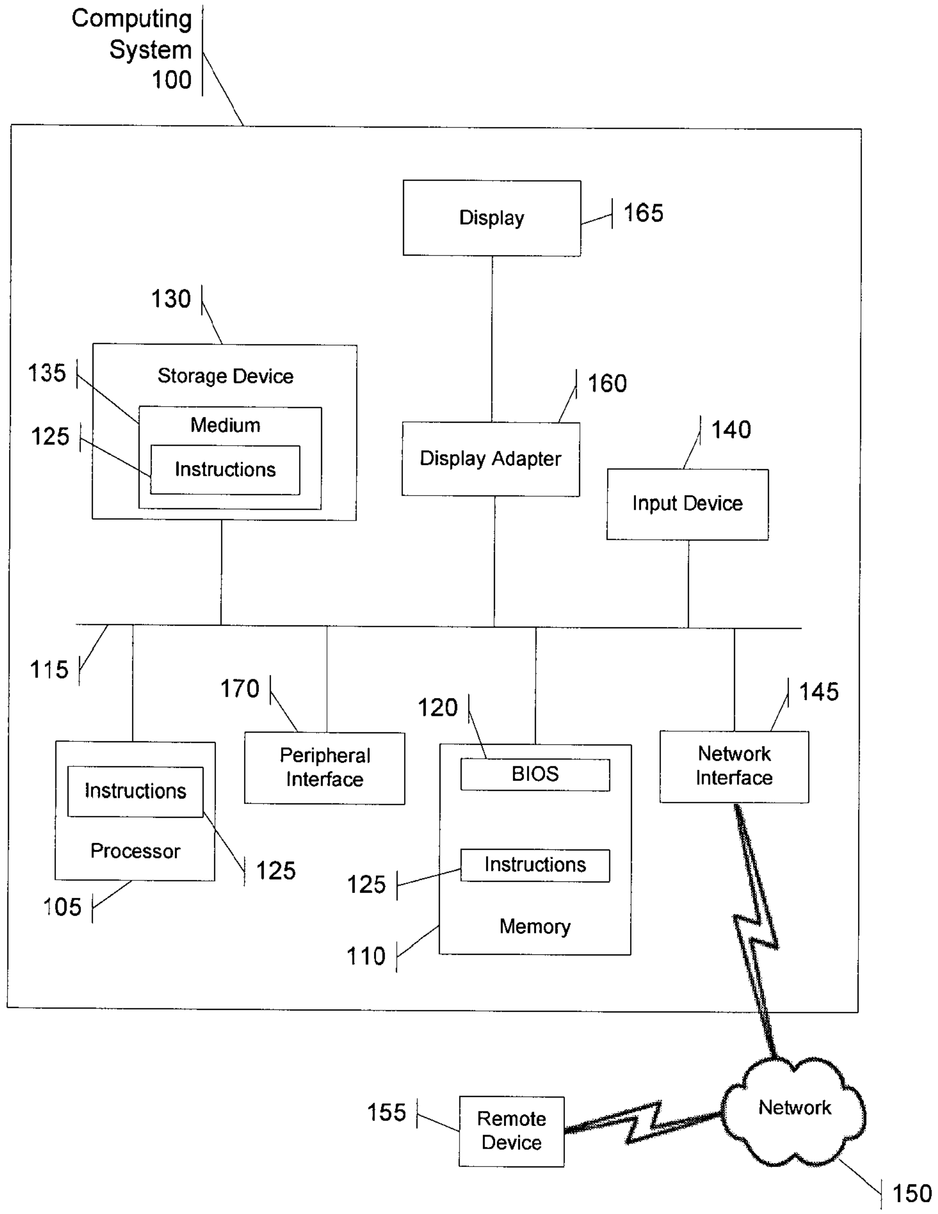
FIG. 1 is a high-level diagram of a computing system suitable for implementing a system and/or method of the present disclosure.

FIG. 1 illustrates a diagrammatic representation of one embodiment of a computing system in the exemplary form of a computer system 100 within which a set of instructions for causing the device to perform any one or more of the aspects and/or methodologies of the present disclosure may be executed. It is also contemplated that multiple computing devices may be utilized to implement a specially configured set of instructions for causing the device to perform any one or more of the aspects, functionalities, and/or methodologies of the present disclosure. Computer system 100 includes a processor 105 and memory 110 that communicate with each other, and with other components, via a bus 115. Bus 115 may include any of several types of bus structures including, but not limited to, a memory bus, a memory controller, a peripheral bus, a local bus, and any combinations thereof, using any of a variety of bus architectures.

Memory 110 may include various components (e.g., machine readable media) including, but not limited to, a random access memory component (e.g, a static RAM "SRAM", a dynamic RAM "DRAM", etc.), a read only component, and any combinations thereof. In one example, a basic input/output system 120 (BIOS), including basic routines that help to transfer information between elements within computer system 100, such as during start-up, may be stored in memory 110. Memory 110 may also include (e.g., stored on one or more machine-readable media) instructions (e.g., software) 125 embodying any one or more of the aspects and/or methodologies of the present disclosure. In another example, memory 110 may further include any number of program modules including, but not limited to, an operating system, one or more application programs, other program modules, program data, and any combinations thereof.

Computer system 100 may also include a storage device 130. Examples of a storage device (e.g., storage device 130) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 130 may be connected to bus 115 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 130 (or one or more components thereof) may be removably interfaced with computer system 100 (e.g., via an external port connector (not shown)). Particularly, storage device 130 and an associated machine-readable medium 135 may provide nonvolatile and/or volatile storage of machine-readable instructions 125, data structures, program modules, and/or other data for computer system 100. In one example, software 125 may reside, completely or partially, within machine-readable medium 135. In another example, software 125 may reside, completely or partially, within processor 105.

Computer system 100 may also include an input device 140. In one example, a user of computer system 100 may enter commands and/or other information into computer system 100 via input device 140. Examples of an input device 140 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 140 may be interfaced to bus 115 via any of a variety of interfaces (not shown) including, but not limited to, a serial interface, a parallel interface, a game port, a USB interface, a FIREWIRE interface, a direct interface to bus 115, and any combinations thereof. Input device may include a touch screen interface that may be a part of or separate from display 165, discussed further below.

A user may also input commands and/or other information to computer system 100 via storage device 130 (e.g., a removable disk drive, a flash drive, etc.) and/or a network interface device 145. A network interface device, such as network interface device 145 may be utilized for connecting computer system 100 to one or more of a variety of networks, such as network 150, and one or more remote devices 155 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 150, may employ a wired and/or a wireless mode of communication. In general, any network topology may be used. Information (e.g., data, software 125, etc.) may be communicated to and/or from computer system 100 via network interface device 145.

Computer system 100 may further include a video display adapter 160 for communicating a displayable image to a display device, such as display device 165. Examples of a display device include, but are not limited to, a liquid crystal display (LCD), a cathode ray tube (CRT), a plasma display, a light emitting diode (LED) display, and any combinations thereof. In addition to a display device, a computer system 100 may include one or more other peripheral output devices including, but not limited to, an audio speaker, a printer, and any combinations thereof. Such peripheral output devices may be connected to bus 115 via a peripheral interface 170. Examples of a peripheral interface include, but are not limited to, a serial port, a USB connection, a FIREWIRE connection, a parallel connection, and any combinations thereof.

In one or more embodiments of the present invention, the inventors have recognized that historical counts are likely to contain important information related to traffic seasonality and growth trend for a particular monitoring site. For example, an examination to the short-term counts between the years 2003 to 2009 from the New Jersey Department of Transportation shows that short-term traffic counts for a specific road segment are collected during different months and days of the week (State of New Jersey Department of Transportation).

In one or more embodiments of the present invention, historical counts (such as counts collected to date (from a given short-term traffic monitoring site)) are used to better understand seasonal traffic patterns, which provides more information for improving assignment of short-term counts to factor groups and resulting AADT estimations.

In a method according to one embodiment of the present invention, traffic counts from previous years are used to create a seasonal traffic pattern. These collected counts are stored in a database based on day of the week and month of the year. Growth factors calculated from a nearby ATR are applied to these historical counts to convert them to the present traffic volumes. After each new short-term count is being collected, it is also added into the dataset, and an estimated seasonal traffic pattern is developed. After each collection cycle, an improved estimated seasonal traffic pattern may be developed.

Using a pattern-matching method, an individual PTC that has the most similar seasonality with the estimated one is selected to derive factors for converting the most recent short-term count to AADT.

Figure 2:
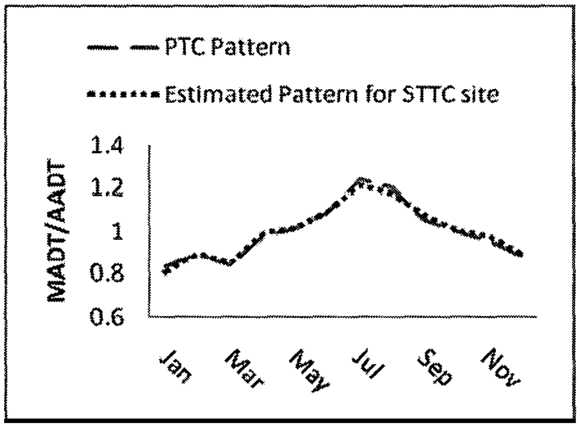
FIG. 2 is a graph depicting the best PTC match using a MSE method according to an embodiment of the present invention.

In one embodiment of the present invention, selected STTCs from different months and years are converted to the most recent year (in this example 2009) using annual growth rate and day of week factors from the nearest PTC to obtain an estimated seasonal pattern. A preliminary AADT estimate for the short-term count site is obtained by averaging AADTs estimated from all historical STTCs and the expansion factors from the nearest PTC of the same functional class. In the next step, a computed seasonal pattern is normalized using the estimated AADT. Then the pattern is compared with all normalized seasonal patterns of all PTCs using the Minimum Squared Error (MSE) Method (Equation [1]). As is shown in FIG. 2, the PTC with the minimum error is selected and appropriate factors from that PTC are applied to most recent STTC for estimating AADT. It can be seen from the FIG. 2 that the seasonal pattern of the selected PTC is very similar to the estimated one for the short-term counting site.

$$MSE = \sum_{i}^{N} (STTC_{MF_i} - PTC_{MF_i})^2 \qquad [1]$$

Figure 3:
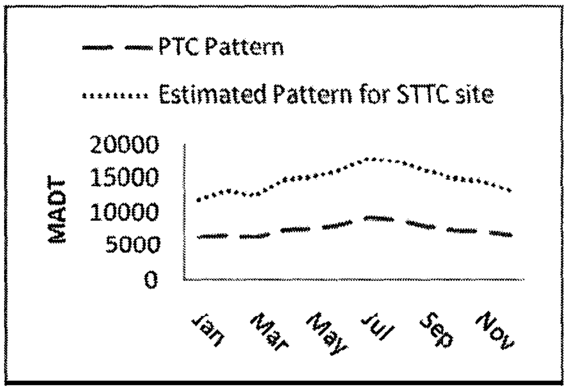
FIG. 3 is a graph depicting the best PTC match using a COV method according to an embodiment of the present invention.

In another embodiment of the present invention, similar to the previous embodiment, short-term counts are converted to the most recent year to find the seasonal pattern, but there is no normalization step. Such a change is to avoid the additional errors introduced in the process of estimating a preliminary AADT for the STTC site required for the normalization step. In this method, instead of matching normalized patterns, the seasonal variations at PTC or ATR sites are compared to the estimated pattern at the STTC site as shown in FIG. 3. In this process, ratios of the average daily volume from a STTC site and that from corresponding days in a same month from each individual PTC are calculated, and Coefficients of Variation (COV) of these ratios are computed. Then the PTC with the smallest COV is selected as the best match and it is used to develop expansion factor for estimating AADT from the latest STTC collected.

$$\text{Ratio } (i) = \frac{STTC_{MADT(i)}}{PTC_{MADT(i)}} \qquad [2]$$

$$i = 1, \ldots , 12$$

$$COV = \frac{\sigma(\text{Ratio (1), Ratio (2), ... Ratio } (n),)}{u(\text{Ratio (1), Ratio (2), ... Ratio } (n),)} \qquad [3]$$

Methods according to embodiments of the present invention for constructing a seasonal traffic pattern for a STTC Site using historical counts are now described in greater detail.

Minimum Squared Error (MSE) Method

In one embodiment of the present invention, counts collected to date are used to create traffic patterns. Historically collected hourly traffic volume data are stored in databases based on day of the week and month of the year. There is a strong clustering among traffic growth rates of the roads, which indicates that nearby roads in most cases have similar annual growth rates. It can also be shown that the closest PTC located on the same functional class road usually has the highest correlation with the STTC site. This growth rate is used to convert or grow all historical counts to the study or current year.

In order to obtain a seasonal pattern of a STTC site, the short-term count collected on a specific day of the week (e.g. Monday) and month (e.g. May) needs to be converted to its equivalent monthly volume. This process is done by applying a so called "Day of the Month" correction factor calculated from the closest PTC on the same functional class to the STTC site as it is presented by Equation [4].

$$DoM_{dij} = \frac{MADT_{ij}}{\left(\frac{\text{Sum of the traffic volume of day 'd' (e.g. Monday) during a given month}}{\text{Number of repeatition of day 'd' within that month}}\right)} \qquad [4]$$

Where,

MADT=Monthly Average Daily Traffic.

DoM=Day of Month Factor.

i=Year number (2003 . . . 2009)

j=Month Number (1 . . . 12).

d=Day of the week.

Historical STTCs are converted to the current year by applying Day of Month and Annual Traffic Growth Rate factors.

$$MADT_{pj} = STTC_{dij} \times DoM_{dij} \times \prod_{k=i}^{p} GR_k \qquad [5]$$

Where,

STTC=Short-Term Traffic Count.

$GR_k$=Annual Traffic Growth Rate for the Year k obtained from the nearest PTC located on the same functional class road.

$MADT_{pj}$=MADT of month j in the study year.

P is a historical epoch and pj is the interval between the historical epoch (e.g. past year(s) and the current epoch (e.g. current year)).

However, it should be noted that if there is more than one historical count available for a specific month but in different years, the final MADT used for constructing seasonal pattern may be an average of MADTs calculated using those counts.

In order to use the MSE method to compare the seasonal pattern of a STTC site to those of the PTCs, these patterns need to be normalized. To normalize the estimated pattern of a STTC site, the estimated MADTs is divided by the AADT of that site. However, since the AADT of the STTC site is not available, a preliminary AADT estimate is obtained by averaging AADTs estimated using all historical STTCs and the expansion factors from the nearest PTC (located on a road of the same functional class) via Equation [6].

$$AADT(\text{Preliminary}) = \frac{\sum_i STTC_{ijd} \times D_{ijd} \times \prod_{k=i}^{p} GR_k}{n} \quad [6]$$

Where, n=Number of counts available

D=Day of the year factor, calculated as:

$$D_{ijd} = \frac{AADT_i}{\frac{\text{Sum of all traffic volume of day } 'd' \text{ in month } 'j' \text{ (e.g. Mondays)}}{\text{The frequency of day } 'd' \text{ in month } 'j' \text{ (4 or 5)}}} \quad [7]$$

And the normalized seasonal pattern for a STTC site is estimated using Equation [8].

$$MF_{pj} = \frac{AADT_{preliminary}}{MADT_{pj}} \quad [8]$$

Where, $MF_{pj}$=Monthly Factor for month j for the current year

Figure 4:
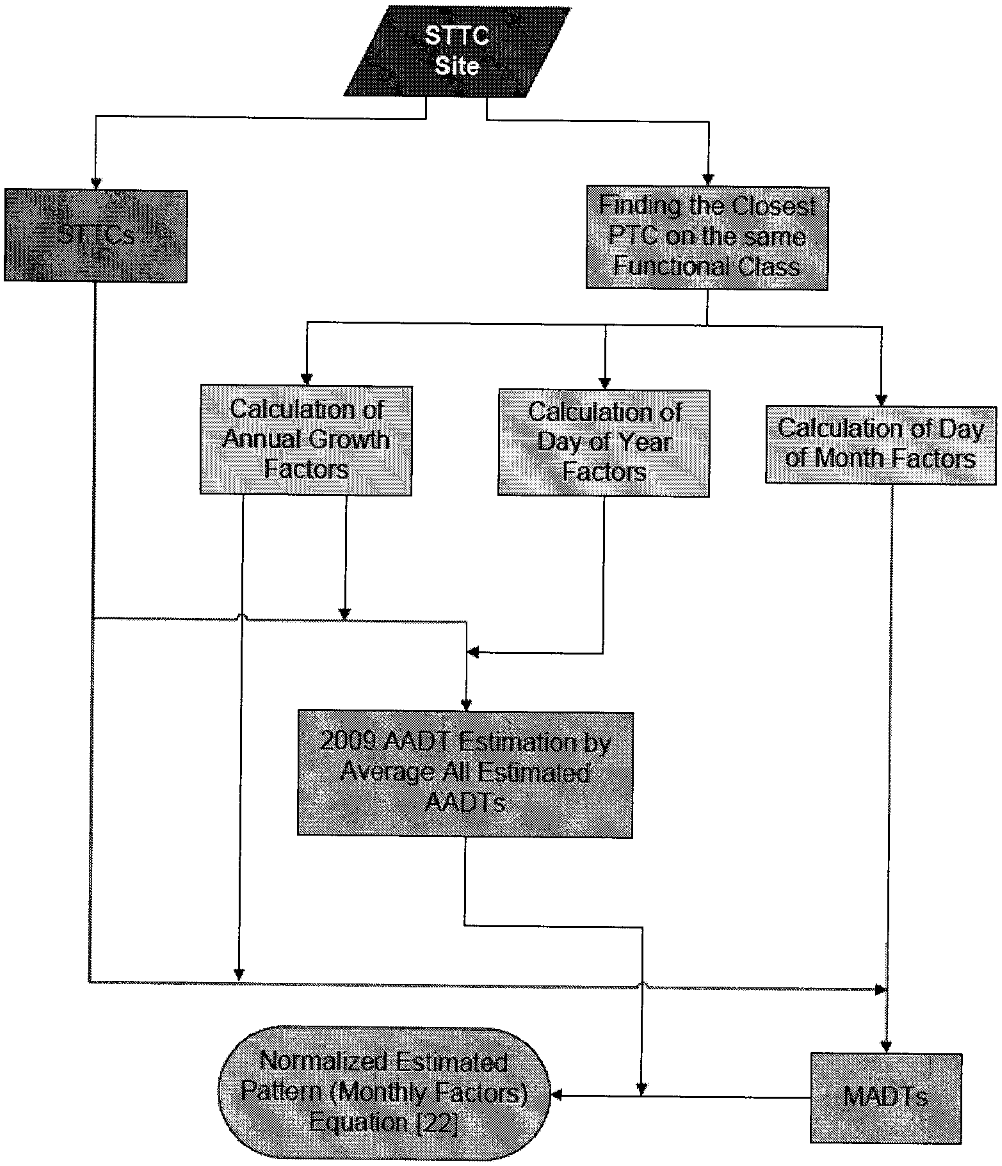
FIG. 4 is a flow diagram for building a normalized seasonal pattern for a MSE method according to an embodiment of the present invention.

The above procedure is summarized in the flowchart shown in FIG. 4.

Coefficient of Variations of MADT Ratios (COV Ratio) Method

In another embodiment of the present invention, similar to the MSE method, historical counts are used to estimate a seasonal pattern for a road segment. A difference in the process of pattern building is the elimination of the normalization step. Such a change is to avoid the additional errors introduced in the process of estimating a preliminary AADT for the STTC site required for the normalization step.

Figure 5:
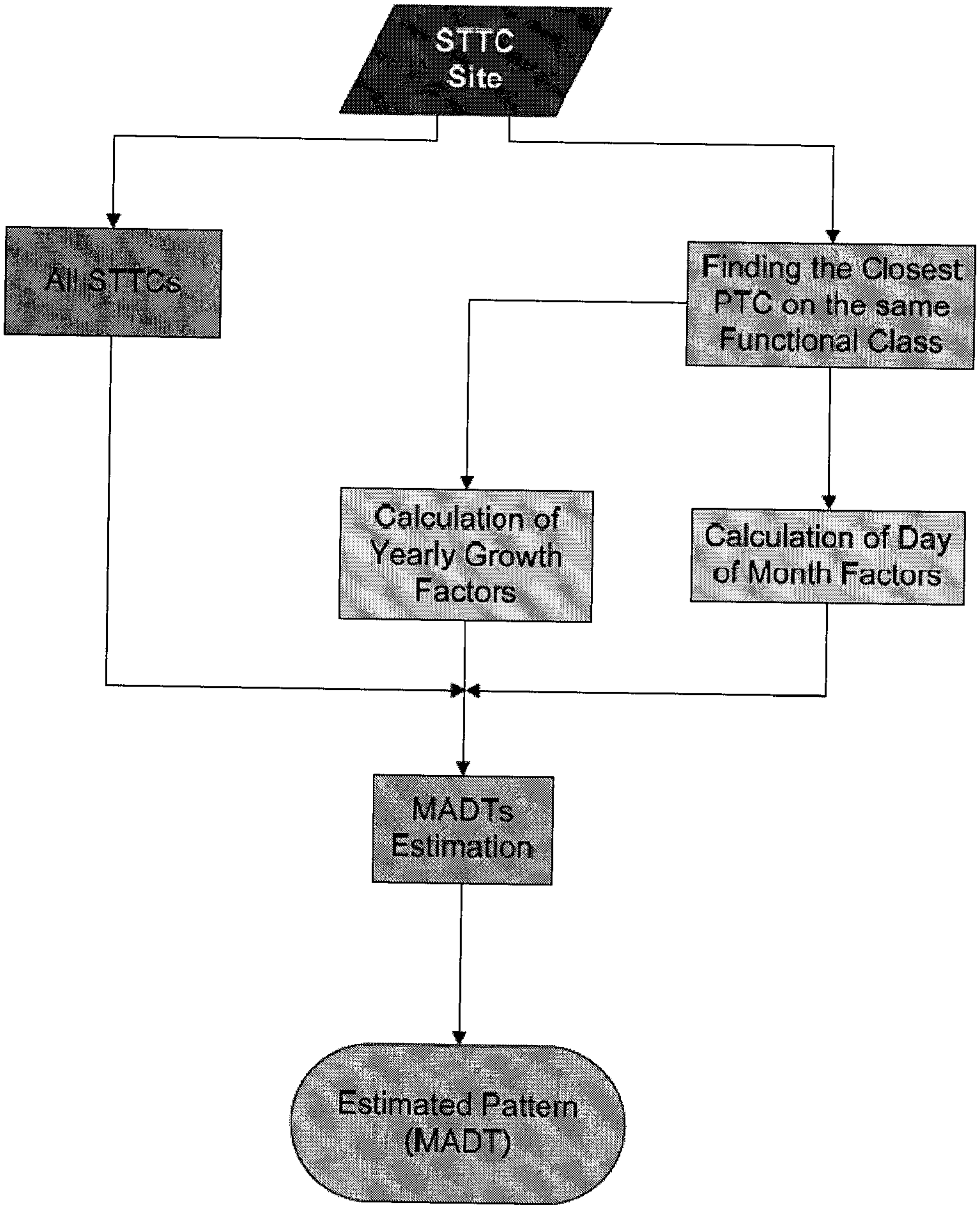
FIG. 5 is a flow diagram for building a normalized seasonal pattern for a COV Ratio method according to an embodiment of the present invention.

Similar to the MSE method, historical STTCs are grown to the present volume using annual traffic growth factors from the closest PTC on the same functional class. These counts are also factored by the Day-of-Month factors from the closest PTC on the same functional class using Equation [4] in order to convert them to monthly volumes. The process of seasonal pattern estimation using this method is depicted in FIG. 5.

Assignment of the Estimated Seasonal Pattern of the STTC Sites to a PTC or PTC Group The next step after the estimation of the seasonal pattern of the STTC site is to assign it to one of PTCs or PTC groups using the MSE or the COV Ratio methods.

Assignment Using the MSE Method

Assignment of STTCs in the MSE method is done by computing the value of MSE for all the available PTCs using Equation [9], basically, the available monthly factors for a given STTC site are compared with corresponding factors from each PTC or PTC group on a month (i) and the PTC with the least MSE score is selected as the best match.

$$MSE = \sum_i^N (STTC_{MF_i} - PTC_{MF_i})^2 \quad [9]$$

AADT for the STTC site is estimated by factoring the latest STTC using the Day-of-Year factor calculated from the best-match PTC.

$$AADT = STTC \times D_{ijd} \quad [10]$$

Where,

AADT=Estimated Annual Average Daily Traffic for the study year

STTC=latest short-term traffic count $D_{ijd}$=Day-of-Year factor computed using Equation [7]

Figure 6:
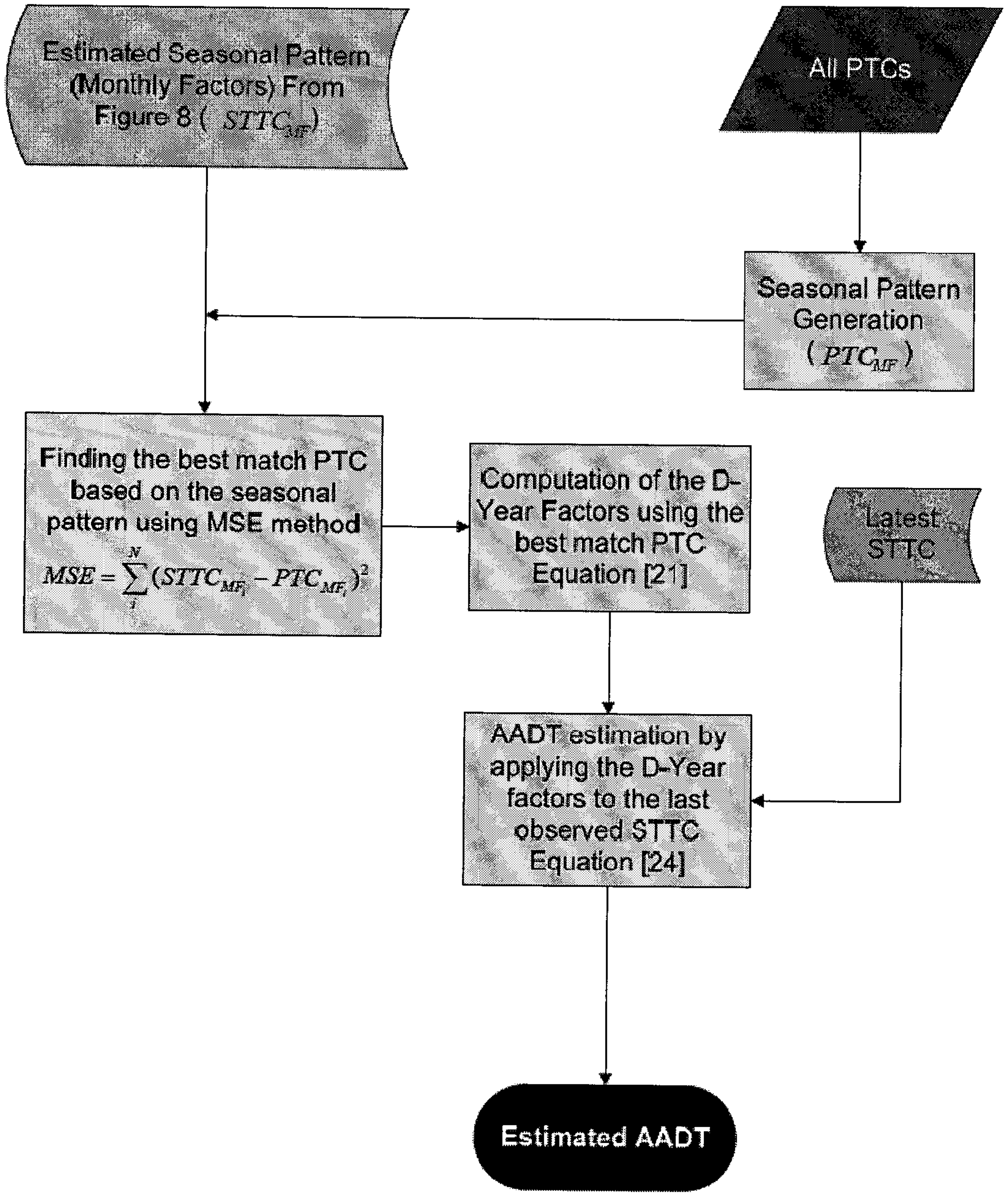
FIG. 6 is a flow diagram for finding the best match PTC (or PTC group) using a MSE method and AADT estimation according to an embodiment of the present invention.

This process is depicted in FIG. 6.

Assignment Using the COV Ratio Method

In another embodiment of the present invention, the seasonal traffic patterns of PTC sites (or PTC groups) are compared to the estimated pattern at the STTC site using a COV (coefficient of variation) approach. In this process, ratios of the monthly average daily volumes (MADT) from a given STTC site and those from corresponding months of each PTC (or each PTC group) are calculated using Equation [11], and the coefficients of variation of these ratios is computed by Equation [12].

$$\text{Ratio } (i) = \frac{MADT^i_{STTC}}{MADT^i_{PTC}} \quad [11]$$

$i$ = the month with available $STTC$ $$\text{COV} = \frac{\sigma(\text{Ratio (1), Ratio (2), ... Ratio } (n))}{u(\text{Ratio (1), Ratio (2), ... Ratio } (n))} \quad [12]$$

Then the PTC (or the PTC group) with the smallest COV is selected as the best match and it is used to develop expansion factors for estimating AADT from the latest STTC collected using Equation [10].

Figure 7:
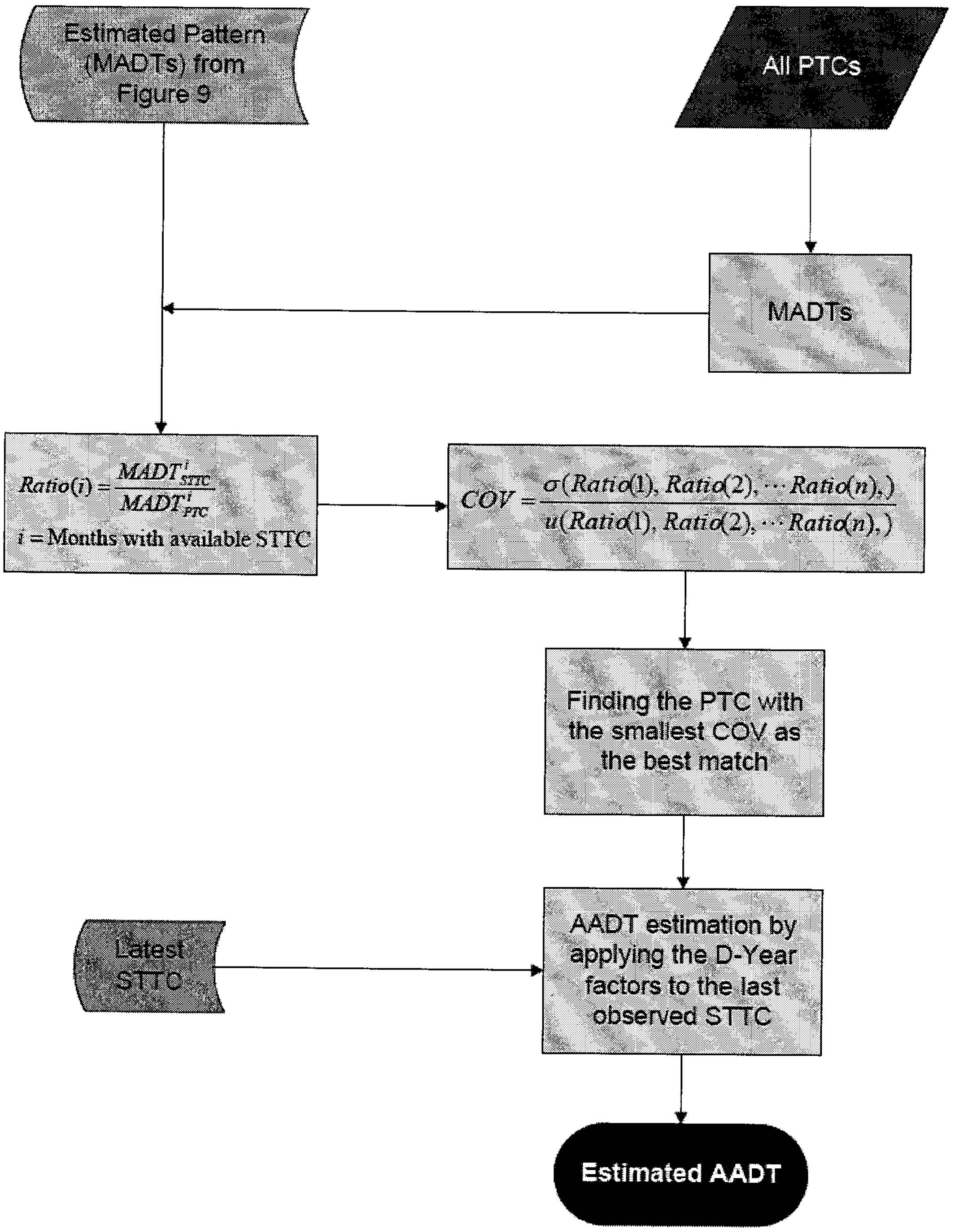
FIG. 7 is a flow diagram for finding the best match PTC (or PTC group) using a COV Ratio method and AADT estimation according to an embodiment of the present invention.
Figure 8:
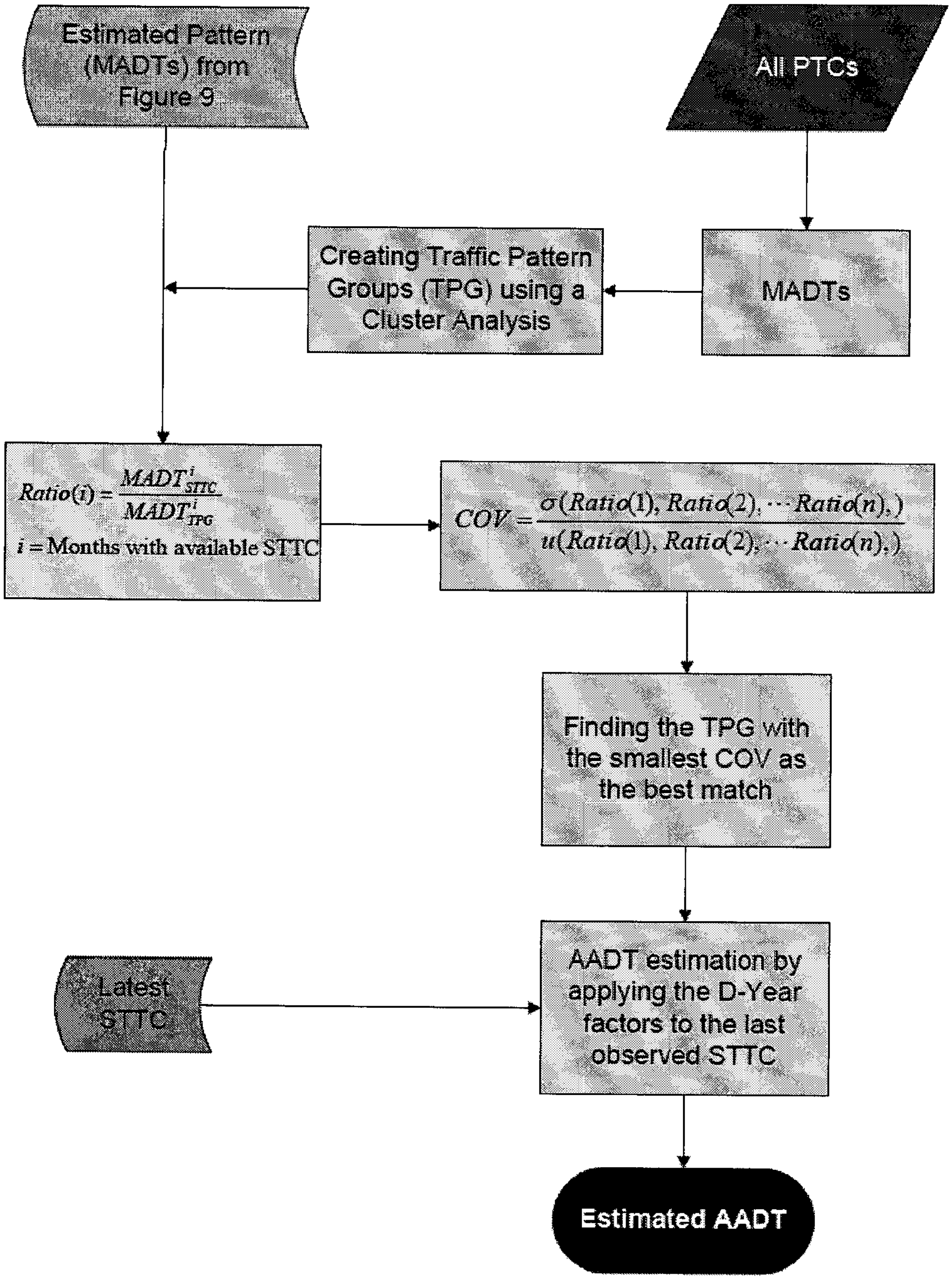
FIG. 8 is a flow diagram for finding the best match PTC group using a COV Ratio method and AADT estimation according to an embodiment of the present invention.

The above COV Ratio method is first used to assign STTCs to PTC or a PTC group. Then the expansion factors from the best-match PTC or PTC group will be applied to convert a short term traffic count to an AADT estimate. These processes are summarized in FIGS. 7 and 8.

Bayesian Assignment of Short-Term Traffic Counts

In a further embodiment of the present invention, the Bayesian method is used. In general, the Bayesian method is based on the incorporation of the prior knowledge or data about the probability of an event, along with new information available about the probability of that event occurring, in order to calculate the new probability (posterior probability) that the event may happen again.

The following sections provide a brief description of the Bayesian framework and how to construct the a Bayesian assignment model according to an embodiment of the present invention. Basically, the proposed model will recalculate the probability of the STTC site belonging to a PTC or a PTC group as new STTC data become available. Based on such a framework the stochastic nature of the STTC assignment is accommodated and an increasing assignment accuracy guaranteed.

Bayes' Theorem

The Bayes' Theorem is based on the conditional probability, which tries to calculate the probability of occurrence of an event A given event B in the sample space C, P(A|B), by knowing the probability of event B happening given the event A in the sample space C, P(B|A) and also using the prior information or probability about the occurring event A in the sample space C, P(A), as presented in the Equation [13].

$$P(A \mid B) = \frac{P(A)P(B \mid A)}{P(B)} \quad [13]$$

Where,

P(A)=Prior probability

P(A|B)=Posterior probability

P(B|A)=Likelihood function

P(B)=Normalization constant

If disjoint events $A_1 \ldots A_n$ in the sample space C are given $$\left(\bigcup_{i=1}^{n} A_i = C\right)$$

then:

$$P(B) = \sum_{j=1}^{n} P(A_j)P(B \mid A_j) \quad [14]$$

The Likelihood Function

The role of the likelihood function in the Bayes' model is to import the effect of the new information into the probability function in order to update the probabilities and to calculate the posterior probability.

In one embodiment of the present invention, the likelihood function is defined as the result of the assignment of a road segment to a PTC or a PTC pattern group using the MSE or COV Ratio methods discussed above. The new information is imported to the Bayesian model when the MSE or COV Ratio methods assign a STTC site to a new PTC or PTC pattern group using an extended seasonal pattern when a new STTC is available.

For a given STTC site, the COV or MSE values for all the PTCs or PTC pattern groups are calculated, and by solving a system of n equations as the following (Equations [15A], and [15B]), a likelihood value for each PTC or PTC pattern group is calculated.

$$\left(\begin{array}{c} P(B \mid PTC_1) + P(B \mid PTC_2) + \ldots + \\ P(B \mid PTC_n) = 1 \\ \frac{P(B \mid PTC_1)}{P(B \mid PTC_2)} = \left(\frac{\mathrm{COV}_2}{\mathrm{COV}_1}\right)^2 \\ \frac{P(B \mid PTC_1)}{P(B \mid PTC_3)} = \left(\frac{\mathrm{COV}_3}{\mathrm{COV}_1}\right)^2 \\ \ldots \\ \frac{P(B \mid PTC_1)}{P(B \mid PTC_n)} = \left(\frac{\mathrm{COV}_n}{\mathrm{COV}_1}\right)^2 \end{array}\right) \Rightarrow \left|\begin{array}{c} P(B \mid PTC_1) \\ P(B \mid PTC_2) \\ \vdots \\ P(B \mid PTC_n) \end{array}\right. \quad [15A]$$

$$\left(\begin{array}{c} P(B \mid PTC_1) + P(B \mid PTC_2) + \ldots + \\ P(B \mid PTC_n) = 1 \\ \frac{P(B \mid PTC_1)}{P(B \mid PTC_2)} = \left(\frac{MSE_2}{MSE_1}\right)^2 \\ \frac{P(B \mid PTC_1)}{P(B \mid PTC_3)} = \left(\frac{MSE_3}{MSE_1}\right)^2 \\ \ldots \\ \frac{P(B \mid PTC_1)}{P(B \mid PTC_n)} = \left(\frac{MSE_n}{MSE_1}\right)^2 \end{array}\right) \Rightarrow \left|\begin{array}{c} P(B \mid PTC_1) \\ P(B \mid PTC_2) \\ \vdots \\ P(B \mid PTC_n) \end{array}\right. \quad [15B]$$

Where, $P(B|PTC_n)$=The likelihood value of the seasonal pattern of the PTC (n) is the best-match, given the estimated pattern B of the STTC site.

These P values associated with each PTC are re-calculated once a new STTC becomes available.

The Prior Probability

The role of this probability in the Bayesian model is to import the previous knowledge about the chance that an event may happen or prior probability in the calculation of the new probability. This probability is actually the posterior probability calculated in the previous step of the model.

In the case of the assignment of a STTC site to a PTC or pattern group, this probability is the posterior probability of that site belonging to each of the PTCs (or PTC groups) computed in the previous step.

In the first step of running the model, if there is no previous knowledge about a STTC site belonging to which PTC groups, in an embodiment of a method according to the present invention, an equal prior probability is assigned to all PTCs and calculated using Equation [16].

$$P(PTC_i) = \frac{1}{n} \quad [16]$$

Where, n=Number of all PTCs or pai coups in the analysis.

i=1 . . . n

Normalization Constant

The normalization constant in the dominator of the Bayesian model contains the number of all possibilities or probabilities in the sample space. This is the same definition in the traditional probabilities where:

$$\text{Probability} = \frac{\text{Number of times of a case occurs}}{\text{total number of trials}} \quad [17]$$

So this constant can be defined as the sum of all probabilities or available possibilities in the sample space as it is shown as the denominator in Equation [18]:

$$P(A_i \mid B) = \frac{P(A_i)P(B \mid A_i)}{\sum_{j=1}^{n} P(A_j)P(B \mid A_j)} \quad [18]$$

In an embodiment of the present invention, this constant is calculated as follows:

$$\sum_{j=1}^{n} P(A_j)P(B \mid A_j) = P(PTC_1)P(B \mid PTC_1) + P(PTC_2)P(B \mid PTC_2) + \ldots + P(PTC_n)P(B \mid PTC_n) \quad [19]$$

This means that the denominator is equal to the sum of the prior probabilities of assignment of a road segments to different PTCs ($P(PTC_j)$)) multiplied by the likelihood function or the new likelihood probability calculated by the COV Ratio or MSE method $P(B|\mathrm{PTC}_j)$).

Posterior Probability

Using the Bayes' theorem, the imbedded new information in the likelihood function and the prior probabilities can be combined to calculate the new probability called posterior probability presented in Equation [20].

$$P(PTC_i \mid B) = \frac{P(PTC_i)P(B \mid PTC_i)}{P(PTC_1)P(B_1 \mid PTC) + P(PTC_2)P(B \mid PTC_2) + \ldots + P(PTC_n)P(B \mid PTC_n)} \quad [20]$$

$$\rightarrow P(PTC_i \mid B) = \frac{P(PTC_i)P(B \mid PTC_i)}{\sum_{j=1}^{n} P(PTC_j)P(B \mid PTC_j)}$$

This probability is computed for all the PTCs or pattern groups using Equation [20], and the one with the highest probability is selected as the best-match PTC for a STTC site to derive appropriate factors to estimate AADT.

Figure 9:
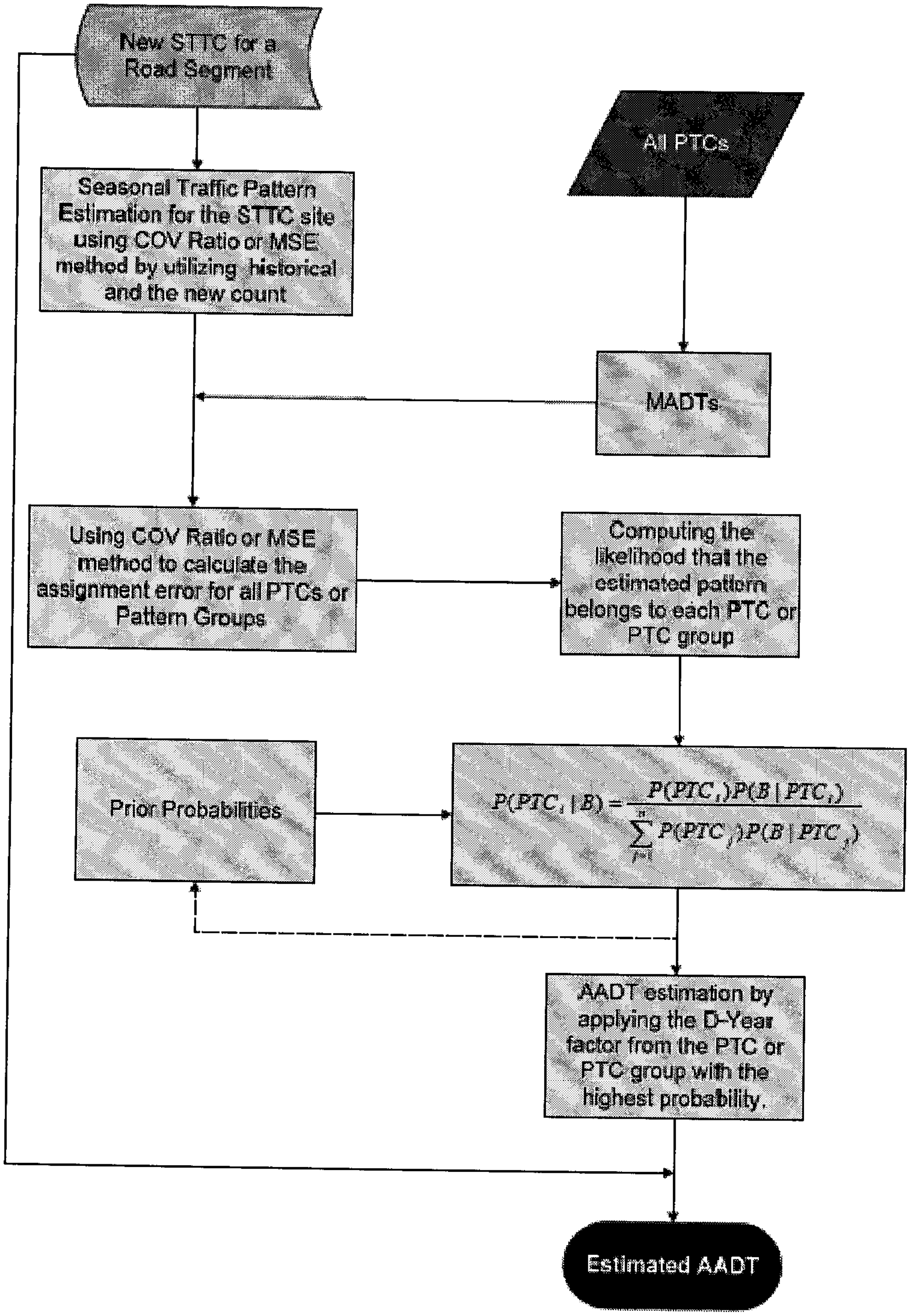
FIG. 9 is a flow diagram of Bayesian assignment of a STTC site to individual PCTs and AADT estimation according to an embodiment of the present invention.

The Bayesian assignment method according to an embodiment of the present invention is shown in FIG. 9.

Methods according to the previous embodiments of the present invention were implemented in software which was coded using MATLAB. Data from a PTC (PTC number 50431450) with a winter recreational seasonal pattern was used. The PTC was located on an expressway, which has an AADT of 8174 vehicles/day. The PTC was used to simulate 45 historical short-term counts between February and November and over different years. AADTs are estimated by applying the above two pattern-matching methods and the FHWA approach to these counts. Table 1 shows the distribution of AADT errors resulting from these methods. The AADT estimation error is calculated using Equation [21]:

$$\text{Error} = \frac{|\text{Estimated } AADT - \text{Actual } AADT|}{\text{Actual } AADT} \times 100 \quad [21]$$

TABLE 1

AADT estimation errors from STTCs using MSE, COV and FHWA methods.

| | MSE Method | COV Ratio Method | FHWA Method |
|---|---|---|---|
| minimum | 0.03 | 0.13 | 0.09 |
| mean | 4.52 | 4.25 | 18.34 |
| p25 | 1.92 | 1.72 | 2.42 |
| median | 4.13 | 4.06 | 6.89 |
| p75 | 6.25 | 5.97 | 32.69 |
| p85 | 8.01 | 7.73 | 36.20 |
| p95 | 10.48 | 8.41 | 62.11 |
| maximum | 16.95 | 13.78 | 68.98 |

The above results show that the COV method according to an embodiment of the present invention produces AADT estimates with the lowest errors and with a P95 error of 8.41%, which is less than 10% recommended by the prior art FHWA method. The MSE method according to an embodiment of the present invention has a P95 error of 10.48%. These results present a significant improvement in the AADT estimation in comparison to the prior art FHWA method, which results in a P95 error of 62%.

We claim:

1. A computer-implemented method for estimating annual average daily traffic for a first epoch for a first road segment comprising:

providing historical traffic counts for the road segment from a short-term traffic counter from one or more historical epochs which predate the first epoch;

providing data from a first permanent traffic counter;

calculating one or more growth factors from the data of the first permanent traffic counter;

applying the one or more growth factors to the historical short-term traffic counts and converting the historical traffic counts to traffic counts in the first epoch;

converting the converted traffic counts in the first epoch to equivalent monthly average daily traffic values;

using the equivalent monthly average daily traffic values to construct a first seasonal traffic pattern for the first road segment;

finding a matching seasonal traffic pattern, derived from a second permanent traffic counter, to the seasonal traffic pattern of the short-term traffic counting site; and deriving by a computer, an annual average daily traffic value from the short-term traffic counter of the first epoch using one or more expansion factors from the second permanent traffic counter for the first road segment.

2. The computer-implemented method of claim 1 wherein the first permanent traffic counter is the permanent traffic counter that is closest to the short-term traffic counter and of the same functional class as the first road segment.

3. The computer-implemented method of claim 1 wherein the matching seasonal traffic pattern is a best-matching seasonal traffic pattern.

4. The computer-implemented method of claim 1 wherein the step of finding a matching seasonal traffic pattern comprising using a pattern matching algorithm.

5. The computer-implemented method of claim 4 wherein the pattern matching algorithm is selected from the group consisting of minimum square error (MSE) and coefficients of variation (COV).

6. The computer-implemented method of claim 1 wherein the first epoch is the current year.

7. The computer-implemented method of claim 1 wherein the matching seasonal traffic pattern is an average of traffic patterns of a permanent traffic counter group.

8. The computer-implemented method of claim 1, further comprising calculating a preliminary annual average daily traffic value for the first road segment.

9. The computer-implemented method of claim 8 further comprising normalizing the first seasonal traffic pattern.

10. The computer-implemented method of claim 9 wherein the step of finding a matching seasonal traffic pattern is carried out using a minimum square error (MSE).

11. The computer-implemented method of claim 1 further comprising applying a Bayesian assignment of the short-term traffic counts to the permanent traffic counter over a period of at least two years.

* * * * *

UNITED STATES PATENT AND TRADEMARK OFFICE

CERTIFICATE OF CORRECTION

PATENT NO. : 8,805,610 B2
APPLICATION NO. : 13/523483
DATED : August 12, 2014
INVENTOR(S) : Ming Zhong et al.

It is certified that error appears in the above-identified patent and that said Letters Patent is hereby corrected as shown below:

On the Title Page

Item (75) order of the inventors under the heading Inventors should read as follows:

Ming Zhong

Ehsan Bagheri

James Christie

Signed and Sealed this
Twenty-fourth Day of February, 2015

Michelle K. Lee
*Deputy Director of the United States Patent and Trademark Office*

UNITED STATES PATENT AND TRADEMARK OFFICE

CERTIFICATE OF CORRECTION

PATENT NO. : 8,805,610 B2
APPLICATION NO. : 13/523483
DATED : August 12, 2014
INVENTOR(S) : Ming Zhong et al.

It is certified that error appears in the above-identified patent and that said Letters Patent is hereby corrected as shown below:

On the Title Page

Item (12) "Bagheri et al." should read -- Zhong et al. --

Item (75) order of the inventors under the heading Inventors should read as follows:

Ming Zhong

Ehsan Bagheri

James Christie

This certificate supersedes the Certificate of Correction issued February 24, 2015.

Signed and Sealed this
Seventeenth Day of March, 2015

Michelle K. Lee

Michelle K. Lee
*Director of the United States Patent and Trademark Office*